US008593656B2

(12) United States Patent
Kuroishi et al.

(10) Patent No.: US 8,593,656 B2
(45) Date of Patent: Nov. 26, 2013

(54) INFORMATION PROCESSING SYSTEM, INFORMATION PROCESSOR AND SIGNAL TRANSMITTING DEVICE

(75) Inventors: Kenji Kuroishi, Ebina (JP); Toshiharu Hayashida, Ebina (JP); Akiko Mochizuki, Ebina (JP); Seigo Makida, Ashigarakami (JP); Yuji Murata, Ebina (JP); Shinho Ikeda, Ebina (JP); Tatsuyuki Tanaka, Ebina (JP); Mitsuharu Ohhata, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 289 days.

(21) Appl. No.: 12/619,429

(22) Filed: Nov. 16, 2009

(65) Prior Publication Data

US 2010/0290074 A1 Nov. 18, 2010

(30) Foreign Application Priority Data

May 14, 2009 (JP) .................................. 2009-117704

(51) Int. Cl.
*G06K 15/00* (2006.01)
(52) U.S. Cl.
USPC ........... 358/1.14; 358/1.15; 709/219; 710/20; 710/240; 705/12
(58) Field of Classification Search
USPC ........... 358/1.14, 1.15, 1.13; 713/300; 399/88
See application file for complete search history.

(56) References Cited

U.S. PATENT DOCUMENTS

| | | | |
|---|---|---|---|
| 6,065,121 A * | 5/2000 | Hobson et al. ................ | 713/300 |
| 6,268,925 B1 * | 7/2001 | Yamanaka .................... | 358/1.14 |
| 6,278,883 B1 * | 8/2001 | Choi ........................... | 455/552.1 |
| 6,493,100 B1 * | 12/2002 | Endo et al. ................... | 358/1.14 |
| 6,804,482 B2 * | 10/2004 | Kim et al. ..................... | 399/88 |
| 6,907,258 B2 * | 6/2005 | Tsutsumi et al. ............. | 455/512 |
| 6,978,323 B1 * | 12/2005 | Kimura et al. ................ | 710/20 |
| 7,057,754 B1 | 6/2006 | Tsuchiya et al. | |
| 7,352,486 B2 | 4/2008 | Tsuchiya et al. | |
| 7,356,614 B2 * | 4/2008 | Kim et al. ..................... | 709/245 |

(Continued)

FOREIGN PATENT DOCUMENTS

| JP | 08-324071 A | 12/1996 |
|---|---|---|
| JP | 2001-180083 A | 7/2001 |

(Continued)

OTHER PUBLICATIONS

Japanese Office Action dated Apr. 16, 2013 issued in Japanese Patent Application No. 2009-117704.

*Primary Examiner* — Steven Kau
*Assistant Examiner* — Ashish K Thomas
(74) *Attorney, Agent, or Firm* — Sughrue Mion, PLLC

(57) ABSTRACT

The information processing system includes: an information processor operating in an active state and a power saving state consuming less power than the active state, and recovering to the active state by receiving a signal in the power saving state and processing information in the signal; a signal transmitting device transmitting a signal to the information processor; and a communication line establishing communication between the information processor and the signal transmitting device. The signal transmitting device transmits the signal after appending, to a predetermined region inside the signal, the identification information for identifying a processing content of the signal. The information processor specifies the processing content from the identification information when receiving, in the power saving state, the signal, recovers to the active state where power is supplied to a functional unit to execute the processing content, and starts processing on information stored in a data region of the signal.

17 Claims, 8 Drawing Sheets

(56) References Cited

U.S. PATENT DOCUMENTS

| | | | |
|---|---|---|---|
| 7,603,590 B2 * | 10/2009 | Kaneda | 714/48 |
| 2006/0187480 A1 * | 8/2006 | Tsuchiya et al. | 358/1.13 |
| 2009/0109485 A1 * | 4/2009 | Yoshida | 358/1.15 |
| 2009/0244588 A1 * | 10/2009 | Kuroishi et al. | 358/1.14 |

FOREIGN PATENT DOCUMENTS

| | | |
|---|---|---|
| JP | 2004-222234 A | 8/2004 |
| JP | 2006-245764 A | 9/2006 |
| JP | 2008-181402 A | 8/2008 |

* cited by examiner

FIG.6

| CODE INFORMATION | PROCESSING CONTENT ASSOCIATED WITH PACKET (1) | PROCESSING CONTENT ASSOCIATED WITH PACKET (2) | PROCESSING CONTENT ASSOCIATED WITH PACKET (3) |
|---|---|---|---|
| 00000000 | PRINT JOB | NOT USE EXTERNAL SHEET SUPPLYING UNIT | NOT USE POST-PROCESSING UNIT |
| 00000001 | PRINT JOB | USE EXTERNAL SHEET SUPPLYING UNIT | NOT USE POST-PROCESSING UNIT |
| 00000010 | PRINT JOB | USE EXTERNAL SHEET SUPPLYING UNIT | USE POST-PROCESSING UNIT |
| ⋮ | ⋮ | ⋮ | ⋮ |
| ⋮ | ⋮ | ⋮ | ⋮ |
| 00000101 | PROVISION OF INFORMATION MANAGED IN MIB | ⋮ | ⋮ |
| 00000110 | TRANSMISSION OF FILES STORED IN CONFIDENTIAL BOX | ⋮ | ⋮ |
| 00000111 | TRANSMISSION OF IMAGE DATA READ BY IMAGE READING UNIT | ⋮ | ⋮ |
| 00001000 | TRANSMISSION OF IMAGE DATA FROM FAX UNIT | ⋮ | ⋮ |
| ⋮ | ⋮ | | |

FIG.7

| CODE INFORMATION | CONTROLLER | UI UNIT | IMAGE OUTPUTTING UNIT | EXTERNAL SHEET SUPPLYING UNIT | IMAGE READING UNIT | FAX UNIT | POST-PROCESSING UNIT | EXTERNAL STORAGE UNIT |
|---|---|---|---|---|---|---|---|---|
| 00000000 | ON | ON | ON | OFF | OFF | OFF | OFF | ON |
| 00000001 | ON | ON | ON | ON | OFF | OFF | OFF | ON |
| 00000010 | ON | ON | ON | ON | OFF | OFF | ON | ON |
| 00000101 | ON | OFF | OFF | OFF | OFF | OFF | OFF | ON |
| 00000110 | ON | OFF | OFF | OFF | ON | OFF | OFF | ON |
| 00000111 | ON | OFF | OFF | OFF | OFF | ON | OFF | ON |
| 00001000 | ON | OFF | OFF | OFF | OFF | OFF | OFF | ON |

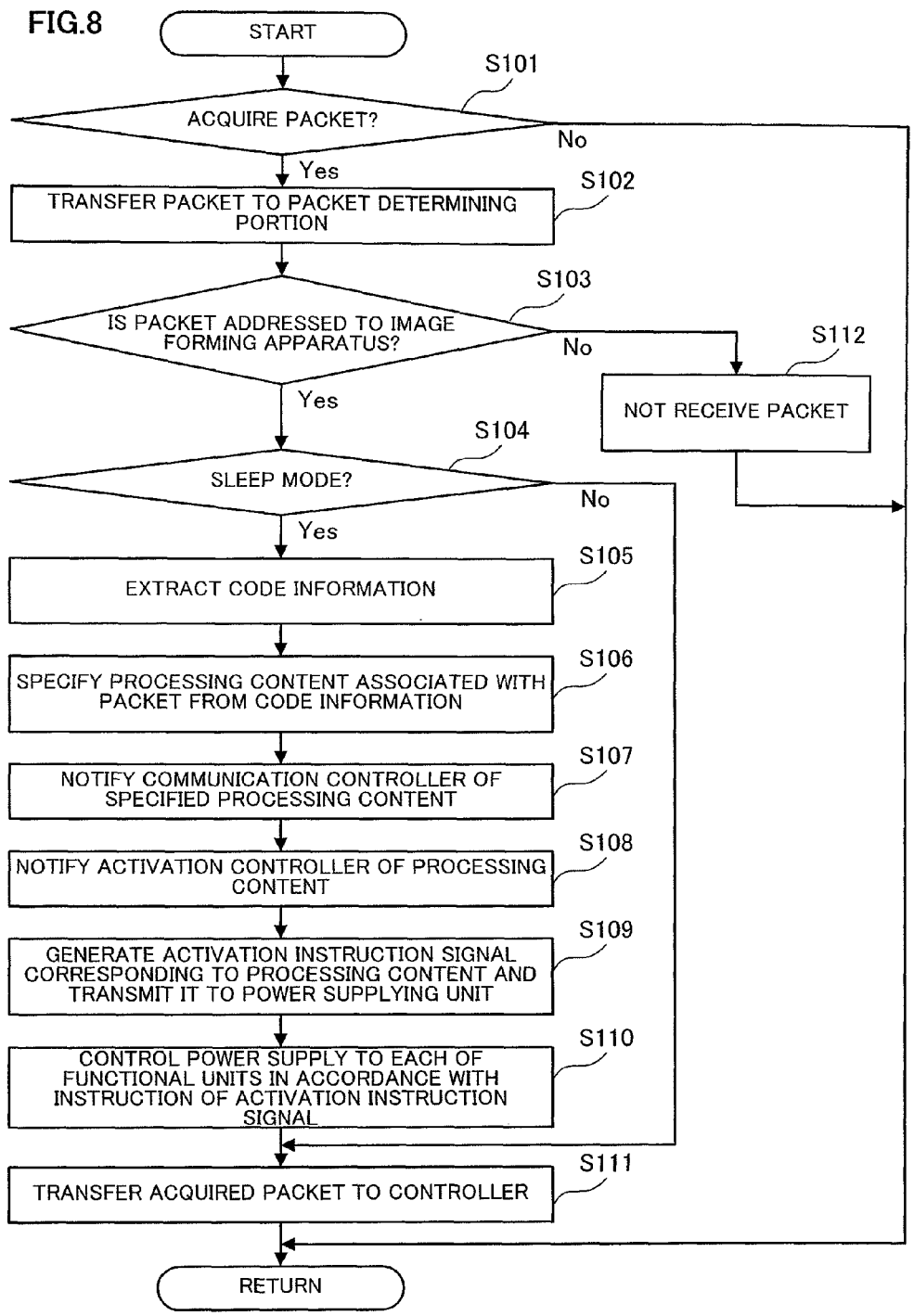

US 8,593,656 B2

INFORMATION PROCESSING SYSTEM, INFORMATION PROCESSOR AND SIGNAL TRANSMITTING DEVICE

CROSS REFERENCE TO RELATED APPLICATIONS

This application is based on and claims priority under 35 USC §119 from Japanese Patent Application No. 2009-117704 filed May 14, 2009.

BACKGROUND

1. Technical Field

The present invention relates to an information processing system, an information processor and a signal transmitting device.

2. Related Art

In general, an information processor such as a printer or a copy machine that receives information including an image formation instruction from a communication line such as a network and then processes the received information is transmitted to a power saving state in accordance with a receiving status of information such as an image formation instruction sent from, for example, a communication line. In the power saving state, power consumption is kept low. Then, when receiving information from the communication line, the information processor recovers from the power saving state.

SUMMARY

According to an aspect of the present invention, there is provided an information processing system including: an information processor that is set to operate in an active state, and a power saving state consuming less power than the active state, and that recovers to the active state by receiving a signal in the power saving state and processes information contained in the signal; a signal transmitting device that transmits a signal to the information processor; and a communication line that establishes communication between the information processor and the signal transmitting device. The signal transmitting device transmits the signal to the information processor after appending identification information to a predetermined region inside the signal to be transmitted, the identification information used for identifying a processing content associated with the signal, and the information processor specifies the processing content of the signal on the basis of the identification information appended to the signal when the information processor receives, in the power saving state, the signal from the signal transmitting device, recovers to the active state in which power is supplied to a functional unit to execute the specified processing content, and starts processing on information stored in a data region of the signal.

BRIEF DESCRIPTION OF THE DRAWINGS

Exemplary embodiment(s) of the present invention will be described in detail based on the following figures, wherein:

FIG. 6 is a diagram showing one example of a correspondence relation table showing a correspondence relation between the code information and "processing contents associated with packets," the correspondence relation table being stored in the code information storing portion of the image forming apparatus and the code information storing portion of the terminal device;

FIG. 7 is a diagram explaining contents indicated by activation instruction signals generated by the activation controller in accordance with processing contents identified by the packet determining portion; and FIG. 8 is a flowchart showing one example of a processing content performed by the image forming apparatus of the exemplary embodiment upon receiving a packet.

DETAILED DESCRIPTION

An exemplary embodiment of the present invention will be described in detail below with reference to the accompanying drawings.

<Description of Image Forming System>

Figure 1:
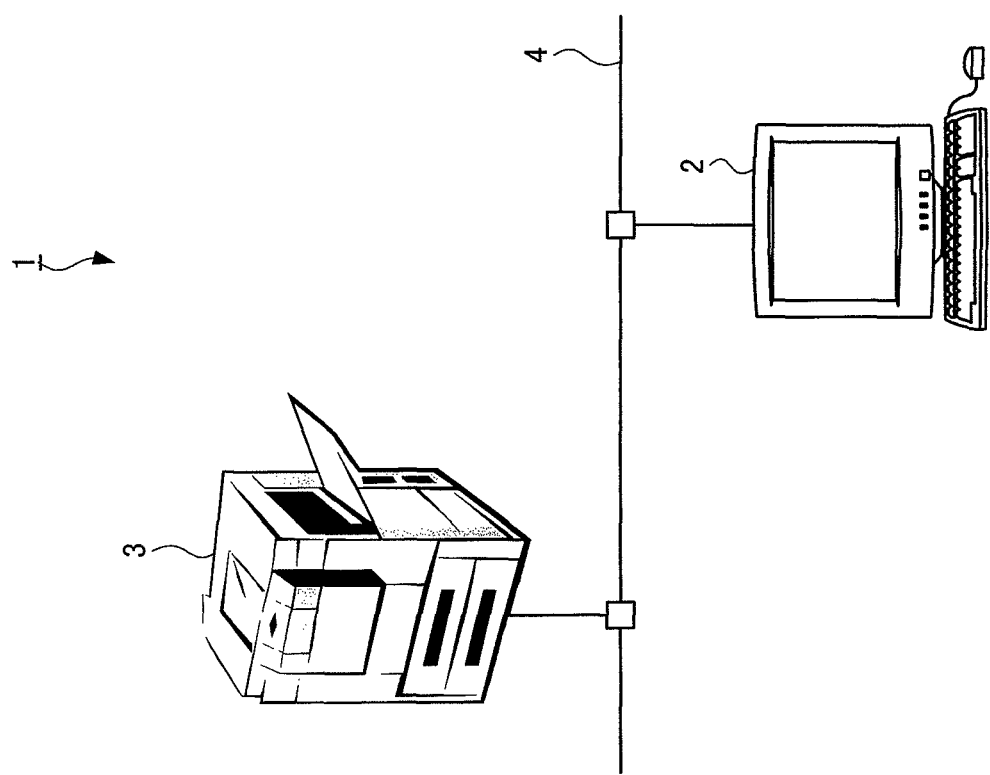
FIG. 1 is a diagram showing a configuration example of an image forming system of the exemplary embodiment.

FIG. 1 is a diagram showing a configuration example of an image forming system 1 of the exemplary embodiment. In the image forming system 1 shown in FIG. 1, a terminal device 2 and an image forming apparatus 3 are mutually communicably connected to each other via a network 4 as an example of a communication line such as a Local Area Network (LAN), a Wide Area Network (WAN) or the Internet. The terminal device 2 is one example of a signal transmitting device and of an external device which is, for example, placed on a working space (for example, a desk) or the like of a user (an operator or a worker). The image forming apparatus 3 is an example of an information processor that processes a signal (information), such as an image forming instruction transmitted from the terminal device 2, and thereby forms an image on a recording medium, for example, on the basis of the image formation instruction. A telephone line, a satellite communication line (for example, a spatial transmission path in digital satellite broadcasting), or the like may be included as the communication line.

Note that, although plural ones of the terminal devices 2 and plural ones of the image forming apparatus 3 are usually connectible onto the network 4, FIG. 1 shows, as one part thereof, a functional part having one of the terminal devices 2 and one of the image forming apparatus 3 connected to the network 4.

Firstly, the terminal device 2 will be described.

For example, a personal computer (PC) is used for the terminal device 2 connected to the network 4, and the terminal device 2 produces, and stores therein, image data formed of documents, figures, graphics, photographs and the like.

Figure 2:
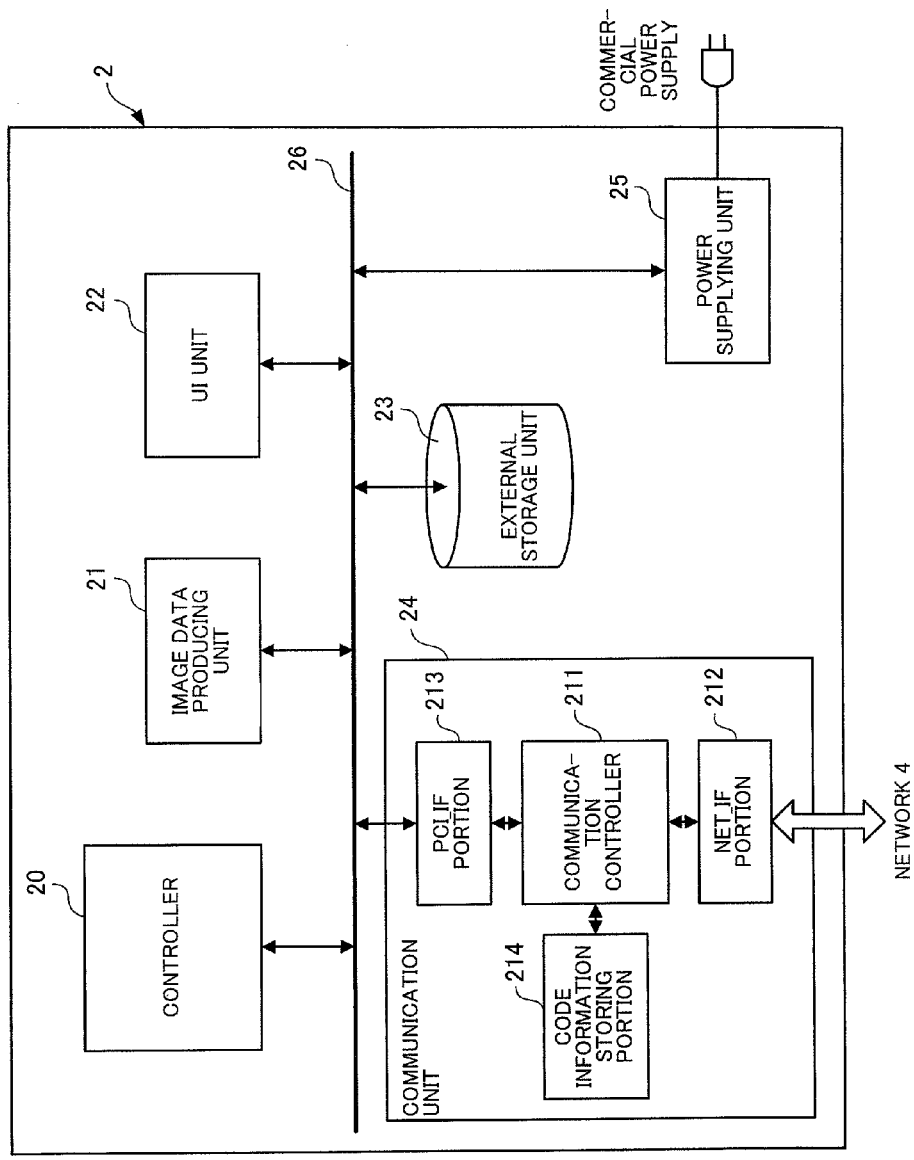
FIG. 2 is a block diagram for explaining a configuration of the terminal device of the exemplary embodiment.

FIG. 2 is a block diagram for explaining a configuration of the terminal device 2 of the exemplary embodiment. As shown in FIG. 2, the terminal device 2 includes: a controller 20 that controls entire operations of the terminal device 2, and performs various kinds of information processing; an image data producing unit 21 that produces image data in accordance with predetermined application software; and a user interface (UI) unit 22 that accepts instructions inputted from the user, and displays various kinds of information to the user. Additionally, the terminal device 2 includes: an external storage unit 23 in which programs, various kinds of data and the like are stored; and a communication unit 24 that transmits, for example, an image formation instruction and the like to the image forming apparatus 3 by performing communication with the network 4. Furthermore, the terminal device 2 includes a power supplying unit 25 that supplies power to each functional unit of the terminal device 2.

These controller 20, image data producing unit 21, UI unit 22, external storage unit 23, communication unit 24 and power supplying unit 25 are connected to a peripheral components interconnect (PCI) bus 26, thereby transmitting and receiving signals and information to and from one another.

The above-mentioned functional units of the terminal device 2 are implemented through cooperation between software and hardware resources. Specifically, in the external storage unit 23, there are stored: an operating system used for controlling each functional unit of the terminal device 2; application software that executes a particular function of each functional unit in cooperation with the operating system; furthermore, a printer driver program that generates an image formation instruction (a print instruction, hereinafter, referred to as a "print job") addressed to the image forming apparatus 3, the image formation instruction being associated with image data produced in the image data producing unit 21, image data stored in the external storage unit 23, or the like. Specifically, an arithmetic device (a CPU) (not shown in the figure) of the terminal device 2 loads these programs from the external storage unit 23 into a main storage unit (for example, a RAM), and performs processing that implements a function of each functional unit such as the controller 20, the image data producing unit 21, the communication unit 24 or the like.

<Description of Processing of Generating and Transmitting Print Job in Terminal Device>

When a print instruction by the user is inputted to the UI unit 22 in the terminal device 2, the controller 20 that functions as a signal generating unit loads a printer driver program from the external storage unit 23, and activates the printer driver program. Thereby, according to the printer driver program, the controller 20 executes processing of generating a print job associated with image data produced in the image data producing unit 21, image data stored in the external storage unit 23, or the like. Then, the controller 20 transmits the generated print job to the image forming apparatus 3 from the communication unit 24.

Note that an "image formation instruction (print job)" indicates a grouped set formed of commands and data, in which various kinds of attribute data are appended to image data, the various kinds of attribute data designating a printing manner, such as the number of printed copies, a sheet size, N-up (printing in which N pages in an electronic document are laid out in one page of a sheet), sizes of margins and the like.

<Description of Services Requested Via Network from Terminal Device to Image Forming Apparatus>

Additionally, the controller 20 that functions as a signal generating unit loads various application software programs from the external storage unit 23 to activate the software programs, and generates a signal (hereinafter, a service packet) addressed to the image forming apparatus 3 connected to the network 4. Here, the service packet requests the image forming apparatus 3 to provide one of various kinds of service. Then, the controller 20 transmits the generated service packet from the communication unit 24.

Specifically, the controller 20 of the terminal device 2 requests the image forming apparatus 3 to provide, for example, services such as: providing information managed by an management information base (MIB) inside the image forming apparatus 3; transmitting any of various files stored in a confidential box inside the image forming apparatus 3; transmitting image data read by an image reading apparatus (image scanner); and transmitting image data by a facsimile.

<Description of Communication Unit of Terminal Device>

The communication unit 24 of the terminal device 2 functions as a transmitting unit that transmits, to the image forming apparatus 3, a print job or a service packet requesting to provide various services. That is, the communication unit 24 includes: a communication controller 211 that controls data communication between the controller 20 and the network 4; a network interface (NET_I/F) portion 212 that performs transmission and reception of data between the communication controller 211 and the network 4; and a PCI interface (PCI_I/F) portion 213 that performs transmission and reception of data between the communication controller 211 and the PCI bus 26.

Furthermore, the communication unit 24 includes a code information storing portion 214 as one example of a memory that stores therein code information indicative of being as a print job, and code information indicative of a kind of service whose provision is requested by each service packet. Here, each piece of "code information" stored in the code information storing portion 214 is formed of 1 byte (8 bits), and pieces of identification information (the code information) for determining whether it is a print job and identifying a kind of service whose provision is requested by a service packet, are assigned to the respective print job and various service packets.

<Description of Processing of Transmitting Print Job and Service Packets in Communication Unit of Terminal Device>

In the terminal device 2 to which a print instruction has been given by the user, a print job corresponding to the print instruction is generated, and then is transmitted to the image forming apparatus 3. On this occasion, the communication controller 211 of the communication unit 24 appends the code information to a predetermined region in the print job to be transmitted. Here, the code information is stored in the code information storing portion 214 and is assigned to the print job. Then, the communication unit 24 transmits the print job to which the code information is appended, to the image forming apparatus 3.

Likewise, when various service packets requesting to provide various kinds of service are transmitted to the image forming apparatus 3, the communication controller 211 of the communication unit 24 appends the code information to a predetermined region in each of the service packets to be transmitted. Here, the code information is stored in the code information storing portion 214, and is assigned to each of the various services whose provision is requested by each of the service packets. Then, the communication unit 24 transmits the service packet to which the code information is appended, to the image forming apparatus 3.

<Description of Image Forming Apparatus>

Next, the image forming apparatus 3 will be described.

Upon reception of a print job or a service packet from the terminal device 2 during a period when a power saving state is set, the image forming apparatus 3 of the present exemplary embodiment operates as follows. Before analyzing data stored in a data region of the packet, the image forming apparatus 3 specifies whether the received signal is the print job, and specifies a kind of service whose provision is requested by the service packet, on the basis of the code information appended to the print job or the service packet. Then, in accordance with the determined print job or identified kind of service, the image forming apparatus 3 determines which of functional units of the image forming apparatus 3 are caused to recover from the power saving state, and immediately starts supplying power to the determined functional units. Furthermore, in the image forming apparatus 3, the print job or the service packet is transferred to a controller (a CPU) that is to process the print job and service packets, and then processing in accordance with the print job or the service packet is performed.

In general, upon receiving a print job or a service packet, the image forming apparatus 3 has to judge if the print job or the service packet is required to be processed by the image forming apparatus 3 itself. For this reason, when receiving various signals (packets) including a print job and various service packets, the controller (the CPU) of the image forming apparatus 3, which is a functional unit that determines the received packets, is caused to recover from the power saving state, and the packets are transferred to the controller recovering from the power saving state. Then, the controller analyzes data stored in data regions of the packets. If the controller has determined that the packets are required to be processed by the image forming apparatus 3 itself, the image forming apparatus 3 starts supplying power to functional units constituting the image forming apparatus 3 in accordance with the print job or the kind of the service packet. Thereby, these functional units are caused to recover from the power saving state.

For this reason, during a period from when the controller receives transfer of a packet to when the controller judges that the packet is a print job or a service packet required to be processed by the image forming apparatus 3 itself, power is not supplied to functional units that function in response to the print job or the service packet, whereby a standby time occurs. Thereby, waiting time of certain length occur from when the user transmits a print job or a service packet requesting to provide one of various kinds of service from the terminal device 2 to when processing corresponding to this is started in the image forming apparatus 3.

Consequently, upon receiving, from the terminal device 2, a print job or a service packet during periods when the power saving state is set, the image forming apparatus 3 of the present exemplary embodiment operates as follows. Before analyzing data stored in data regions of the packets, the controller (the CPU) determines whether the received signal is the print job, and determines a kind of service whose provision is requested by the service packet to specify the signal, on the basis of the code information appended to the print job or the service packet. Then, in accordance with the specified print job or the kind of service, functional units of the image forming apparatus 3 that should be caused to recover from the power saving state is decided, and power supply to the decided functional units is immediately started. Furthermore, the print job or the service packet is transferred in response to the start of power supply to the functional unit (the controller) that determines the packets.

Thereby, before the functional unit (the controller), which determines a packet, performs determination processes of the packets, the received signal is specified whether it is a print job and kind of service whose provision is requested by the service packet is specified, and then power supply to necessary functional units is started. For this reason, necessary functional units are set in an active state at time point when the controller receives a print job or a service packet, and waiting time until processing corresponding to the received print job or the service packet is started is shortened. Additionally, since power is supplied only to the functional units that function in response to the corresponding print job or the service packet, power consumption is reduced as well.

Next, a configuration of the image forming apparatus 3 of the present exemplary embodiment that performs the above-mentioned operations will be described.

Figure 3:
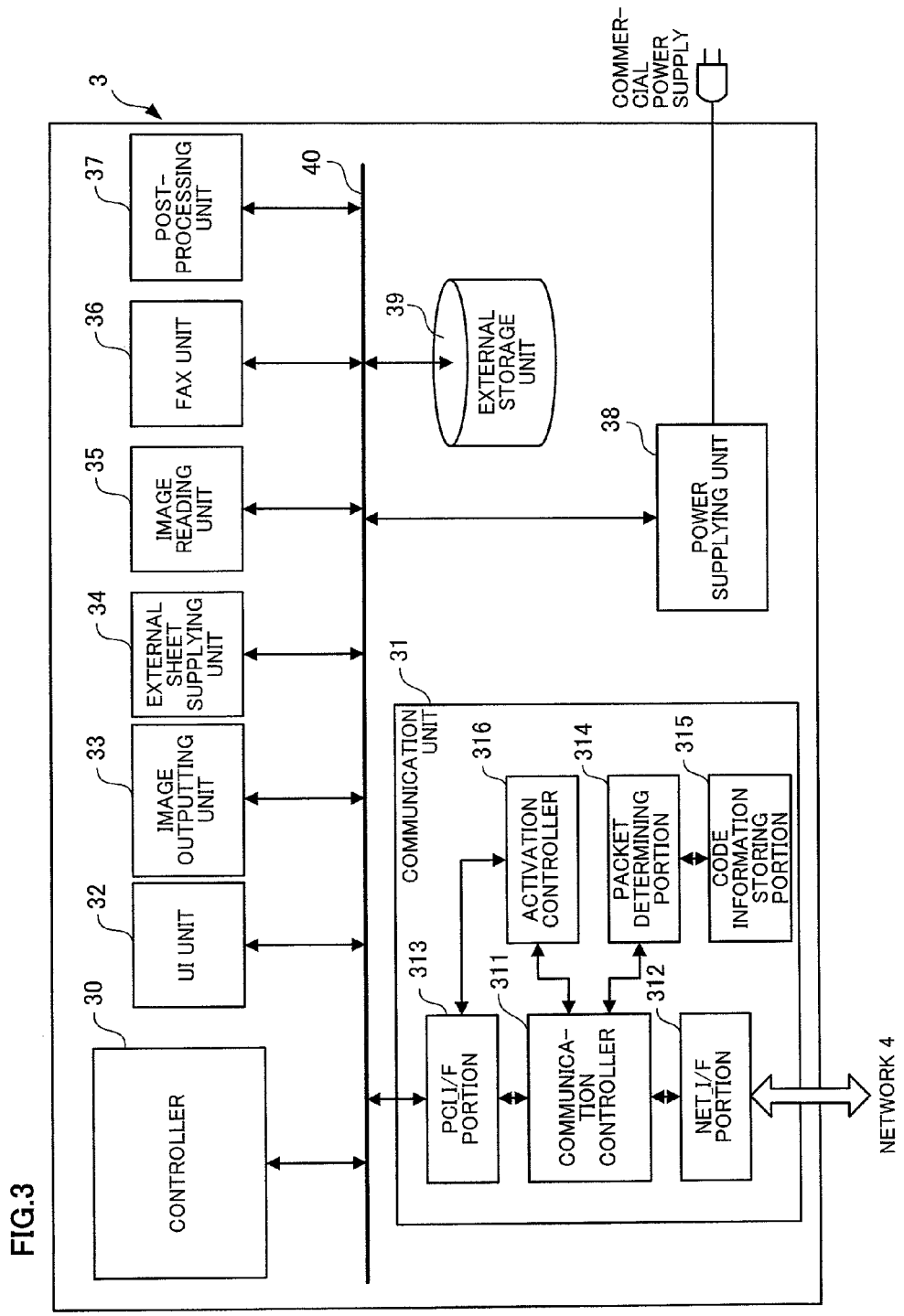
FIG. 3 is a block diagram for explaining the configuration of the image forming apparatus of the exemplary embodiment.

FIG. 3 is a block diagram for explaining the configuration of the image forming apparatus 3 of the exemplary embodiment. As shown in FIG. 3, the image forming apparatus 3 includes: a controller 30 that performs various kinds of information processing, which include control of entire operations of the image forming apparatus 3 and image processing; and a communication unit 31 as one example of a receiving unit that receives various signals (packets) by performing communication with the network 4.

Additionally, the image forming apparatus 3 includes: a user interface (UI) unit 32 that accepts instructions inputted from the user at an operation input portion (not shown in the figure), and displays various kinds of information on the display unit (not shown in the figure) to the user; and an image outputting unit 33 as one example of an image forming unit that forms an image on a recording medium (a paper sheet or a sheet) in accordance with a print job transmitted from the terminal device 2 via the network 4. For example, an image forming engine of an electrophotographic method is employed as the image outputting unit 33.

Furthermore, the image forming apparatus 3 includes: an external sheet supplying unit 34 that is externally attached to the image forming apparatus 3 and supplies sheets to the image outputting unit 33; and an image reading unit 35 that reads reflectance data of each color component from an original copy and produces image data. Furthermore, the image forming apparatus 3 additionally includes: a facsimile unit (FAX unit) 36 that transmits and receives facsimile data (image information) via, for example, a public telephone line or the Internet; and a post-processing unit 37 that performs post-processing on sheets having images formed thereon, the post-processing including binding, punching and the like.

In addition, the image forming apparatus 3 includes an external storage unit 39 composed of, for example, a hard disk (HDD) in which there are stored: an operating system used for controlling the functional units of the image forming apparatus 3; various programs, such as application software, that execute specific functions of the respective functional units in cooperation with the operating system; and various kinds of data such as image data.

Additionally, the image forming apparatus 3 includes a power supplying unit 38 as an example of a power supply unit that supplies alternating-current power of, for example, 100 V supplied from a commercial power supply, or that converts alternating-current power supplied from a commercial power supply, into a predetermined direct-current voltage (at, for example, 24 V, 12 V, 5 V or 3 V), and then supplies the direct-current voltage to each of functional units. Then, the power supplying unit 38 supplies or stops drive-system power and control-system power to each of the functional units, in accordance with operational states of the image forming apparatus 3, which are set in the controller 30. On the other hand, the power supplying unit 38 constantly supplies control-system power to the communication unit 31 regardless of the operational states of the image forming apparatus 3.

The above-mentioned controller 30, communication unit 31, UI unit 32, image outputting unit 33, external sheet supplying unit 34, image reading unit 35, FAX unit 36, post-processing unit 37, power supplying unit 38, and external storage unit 39, which are arranged in the image forming apparatus 3, are connected to a PCI bus 40, thereby transmitting and receiving signals to and from one another.

Additionally, the above-mentioned functional units in the image forming apparatus 3 are implemented through cooperation between software and hardware resources. Specifically, an arithmetic device (a CPU) (not shown in the figure) of the image forming apparatus 3 loads an operating system and various programs such as application software from the external storage unit 39 into a main memory device (for example, a RAM), and executes: processing that implements functions of the respective functional units such as the controller 30, the communication unit 31, the UI unit 32, the image outputting unit 33, the external sheet supplying unit 34, the image reading unit 35, the FAX unit 36, the post-processing unit 37, the power supplying unit 38, and the external storage unit 39; operational control for the respective functional units; information processing; and the like.

As another form of providing this operating system and the various programs such as application software, there is a form in which the programs are provided in a state previously stored in a read-only memory device (a ROM) and then loaded into a main memory device (a RAM). Furthermore, in a case of including a rewritable ROM such as an EEPROM, there is another form in which, after the arithmetic device (the CPU) is set, only the programs are installed into the ROM and then loaded into a RAM. Besides, there is another form in which the programs are transmitted to the CPU via the network 4 such as the Internet, then installed into a ROM and then loaded into a RAM. Furthermore, there is also another form in which the programs are loaded into a RAM from an external recording medium such as a DVD-ROM or a flash memory.

<Description of Function of Controller in Image Forming Apparatus>

Next, functions of the controller 30 of the image forming apparatus 3 will be described.

The controller 30 of the image forming apparatus 3, firstly, has a function of processing a print job transmitted, for example, from the terminal device 2 to the image forming apparatus 3 itself via the network 4. That is, the controller 30 applies processing (image processing) to image data contained in the print job, in accordance with a print job transmitted from the network 4, and then transfers the image data after the image processing to the image outputting unit 33.

Note that image processing applied by the controller 30 to image data contained in a print job includes: PDL analysis processing in which image data of a page description language (PDL) format included in the print job is analyzed, and intermediary data is produced; rendering processing in which the intermediary data generated by the PDL analysis processing is developed (rendered) into image data (raster image data or the like) expressed in the form of pixel arrays and used for image formation; color conversion processing in which color conversion on the rendered image data is performed so that the rendered image data may be converted into image data (for example, YMCK) of a color coordinate system suitable for print processing; screen processing on the image data obtained through the color conversion; and the like.

Figure 4:
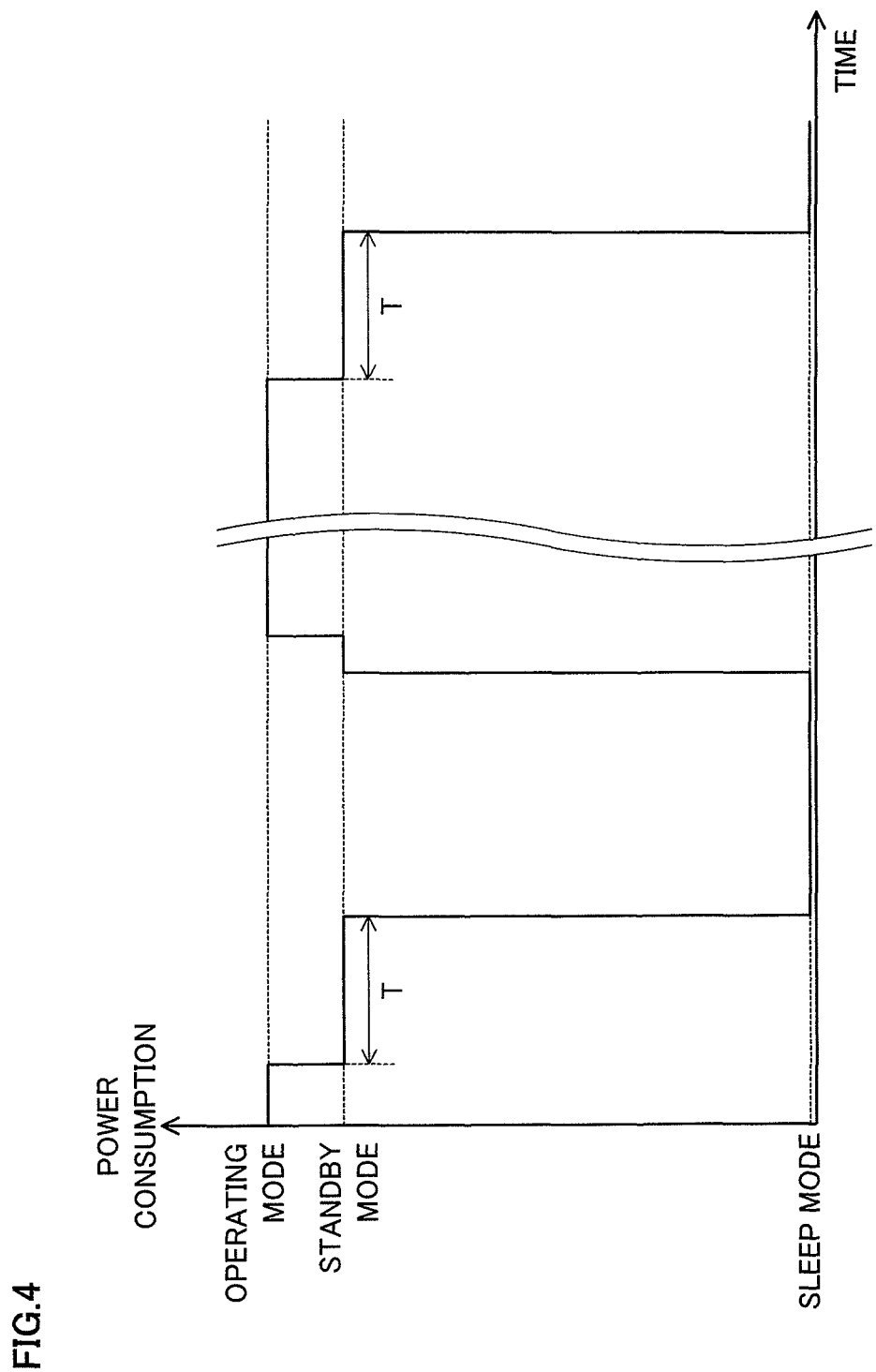
FIG. 4 is a graph for explaining the operational states set for the image forming apparatus of the exemplary embodiment.

Additionally, the controller 30 has a function of controlling operational states of the image forming apparatus 3 in accordance with, for example, a reception status of a packet from the terminal device 2, and the like. FIG. 4 is a graph for explaining examples of the operational states set for the image forming apparatus 3 of the exemplary embodiment. As shown in FIG. 4, the controller 30 selectively sets, for example, as an operational state, any one of an "operating mode", and "standby mode" as examples of an active state, and a "sleep mode" as one example of a power saving state.

The operating mode is an operational state which is set, for example, when image data to which image processing has already been applied is transferred to the image outputting unit 33. In the operating mode, image formation on a sheet in accordance with a print job is executed by the image outputting unit 33 which is one of the functional units of the image forming apparatus 3. On the other hand, the standby mode is set, for example, when a print job is acquired from the terminal devices 2 and when an instruction is inputted from the user through the UI unit 32, and the like. Additionally, the standby mode is an operational state that immediately transitions to the operating mode, for example, after image processing of an entirety or a part of image data contained in a print job is completed in the controller 30. Furthermore, in some cases, the standby mode is also set for a predetermined period (a standby time T) after the end of the operating mode in which image formation is executed. In the operating mode and in the standby mode substantially equivalent to the operating mode, drive-system power is supplied from the power supplying unit 38 to any functional units in the image forming apparatus 3, which perform operations for image formation, whereas control-system power is supplied to any functional units that perform control and processing for image information. Note that, in some cases, the standby mode may not be set in an operating mode (for example, the operating mode in which a service packet is processed) other than the operating mode in which image formation is executed.

The sleep mode is an operational state which is set when any one of a print job and service packets in the communication unit 31 is not received and the user instruction through the UI unit 32 is not inputted until the predetermined stand-by time T elapses, for example, after the end of the operating mode or after the setting of the standby mode. In the sleep mode, normally, only the communication unit 31 and the operation input portion (not shown in the figure) of the UI unit 32 continue operating, and the other functional units including the controller 30 stop operating. That is, in the sleep mode, supply of control-system power from the power supplying unit 38 to the communication unit 31 and the operation input portion of the UI unit 32 is continued. On the other hand, drive-system power and control-system power from the power supplying unit 38 to functional units in the image forming apparatus 3 other than the communication unit 31 and the operation input portion of the UI unit 32 are stopped. Thereby, power saving in the image forming apparatus 3 through the sleep mode is achieved.

Additionally, the controller 30 of the image forming apparatus 3 has a function of providing various kinds of service that are requested by a service packet received by the communication unit 31. That is, the controller 30 analyzes the received service packet, and specifies, by using protocol types and port numbers written in the service packet, service which the image forming apparatus 3 is requested by the service packet to perform. Then, the controller 30 provides the requested service on the basis of protocols identified by the protocol types and the port numbers. Furthermore, the controller 30 transmits information generated by the provision of the service to an originator of the service packet via the communication unit 31, if needed.

<Description of Communication Unit of Image Forming Apparatus>

Next, the communication unit 31 of the image forming apparatus 3 will be described.

The communication unit 31 of the image forming apparatus 3 performs data communications with the network 4. As shown in FIG. 3 mentioned above, the communication unit 31 includes: a communication controller 311 that controls data communications between the controller 30 and the network 4; a PCI interface (PCI_I/F) portion 313 that performs transmission and reception of data between the communication controller 311 and the PCI bus 40; and a network interface (NET_I/F) portion 312 that performs transmission and reception of data between the communication controller 311 and the network 4.

Furthermore, the communication unit 31 includes a packet determining portion 314, a code information storing portion 315 and an activation controller 316.

The packet determining portion 314 acquires a packet received from the NET_I/F portion 312, from the communication controller 311. Furthermore, the packet determining portion 314 determines whether the acquired packet is addressed to the image forming apparatus 3 itself by performing screening (filtering) on the basis of identification information such as a destination MAC address and a destination IP address of the acquired packet. Then, the packet determining portion 314 notifies the communication controller 311 of a result of the determination. For example, if the received packet is addressed to the image forming apparatus 3 itself, the packet determining portion 314 notifies the communication controller 311 of that determination. Thereby, the communication controller 311 transfers the packet addressed to the image forming apparatus 3 itself to the controller 30.

Additionally, the packet determining portion 314 is one example of a specifying unit that specifies processing contents of signals. Upon receiving a print job or a service packet during a period when the sleep mode is set, the packet determining portion 314 specifies whether the received signal is the print job, and specifies a kind of service whose provision is requested by the service packet, on the basis of code information written in a predetermined region in the received print job or service packet That is, as has been mentioned above, the terminal device 2 transmits a print job to the image forming apparatus 3 after appending, to the predetermined region in the print job, the code information assigned to the print job. Additionally, the terminal device 2 transmits a service packet to the image forming apparatus 3 after appending, to the predetermined region in the service packet, the code information that is assigned to a kind of service whose provision is requested by the service packet. Thereby, the packet determining portion 314 extracts the code information written in the received print job or service packet, and then refers to the code information stored in the code information storing portion 315 to specify a content of the packet corresponding to the extracted code information. Thereby, with respect to the received print job or service packet, the received signal is specified whether it is the print job, or a kind of service whose provision is requested by the service packet is specified.

Here, the code information storing portion 315 is one example of a memory, and stores therein: information on a region in which the code information is written in each packet; and the same code information as the code information indicative of being as a print job, and code information specifying a kind of service whose provision is requested by each service packet, which are stored in the code information storing portion 214 arranged in the terminal device 2. These pieces of information are the same as those stored in the code information storing portion 214 of the terminal device 2, and one-to-one correspondence between each piece of the information held by the terminal device 2 and a corresponding piece of the information held by the image forming apparatus 3 is maintained.

The activation controller 316 generates an activation instruction signal corresponding to a processing content associated with a packet specified by the packet determining portion 314, and then transmits the activation instruction signal from the PCI_I/F portion 313 to the power supplying unit 38 via the PCI bus 40. Thereby, the power supplying unit 38 starts supplying power to functional units corresponding to the processing content associated with the packet.

<Description of Code Information Written in Print Job and Packets>

Next, the code information written in a print job and service packets will be described.

Figure 5:
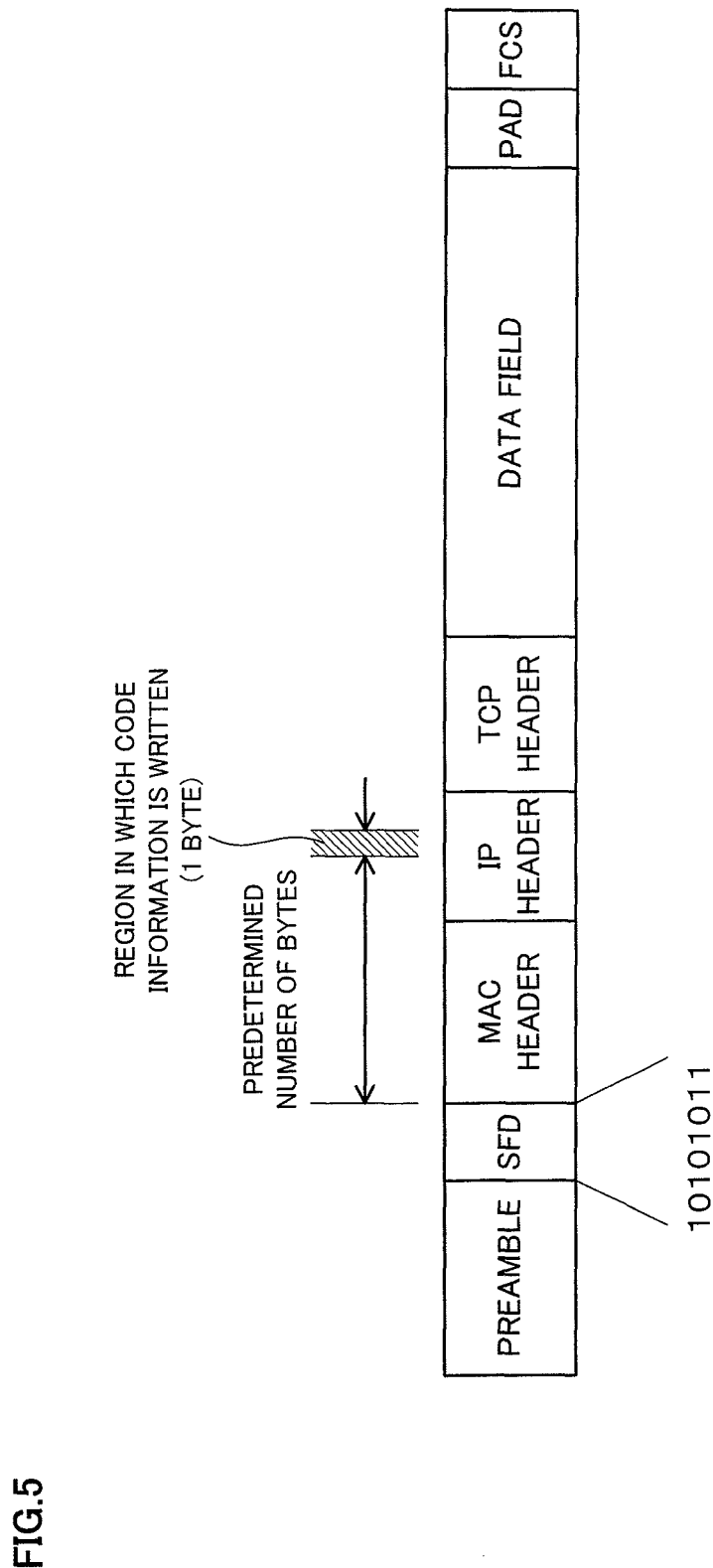
FIG. 5 is an example showing a data structure of a signal (a packet) transmitted from the terminal device.

Firstly, FIG. 5 is an example showing a data structure of a signal (a packet) transmitted from the terminal device 2. As shown in FIG. 5, the packet transmitted from the terminal device 2 is composed of, for example, a preamble, a start frame delimiter (SFD), a medium access control (MAC) header, an internet protocol (IP) header, a transmission control protocol (TCP) header, a data field (a data region), a PAD and a frame check sequence (FCS).

The preamble is data (Syn) used for notifying other nodes (for example, the terminal device 2 and the image forming apparatus 3) that transmission of the packet is started, and also, for achieving synchronization of communication. Additionally, the SFD is, for example, a fixed 1-byte (8-bit) bit sequence "10101011." In the SFD, the first 6 bits "101010" is continuation of a synchronization signal of the preamble, and the last 2 bits "11" is data representing start of the packet.

The MAC header is composed of a destination MAC address, an originator address, and a type. The destination MAC address is an address indicating a destination to which data of an application should be delivered. The originator address is a MAC address of an originator. The type is information (a protocol type) indicating an upper-layer protocol stored in the data field.

The IP header is composed of an originator IP address, a destination IP address, and a data string containing a packet length and the like. The TCP header is composed of an originator port number, a destination port number, a sequence number and a data string containing a response acknowledgment number and the like.

In the data field (the data region), data of the application such as, for example, image data or the like is stored, with the data being in the range of 46 to 1500 bytes. Additionally, the PAD is a bit sequence used for setting a length of the packet to the minimum possible size of 64 bytes. The FCS is a bit sequence used for checking whether the packet has been damaged.

In addition, the code information written in the packet (the print job or the service packet) transmitted from the terminal device 2 is written in, for example, a region having a predetermined data amount (for example, 1 byte), the region starting from a position following a predetermined data amount (number of bytes) after the tail end of the SFD (refer to FIG. 5). That is, the region in which the code information is written is set to be, for example, a 1-byte region which is written after a predetermined number of bytes from the last 2 bits "11" of the SFD. In addition, the terminal device 2 and the image forming apparatus 3 uniformly make a determination on the region (a written position) where the code information is to be written in the packet. As long as the determination on the region is uniformly made by the terminal device 2 and the image forming apparatus 3, the code information may be written in any one of the MAC header, the IP header, the TCP header and the data field.

However, the preamble and the SFD are bit sequences constituting a forehead part of the packet, and therefore, are immediately transmitted from the terminal device 2 to the image forming apparatus 3. For this reason, if the code information is set to be written inside the synchronization signal of the preamble or the SFD, a processing content associated with the packet is specified at an early point. For this reason, writing the code information inside the synchronization signal of the preamble or the SFD may shorten a waiting time until processing corresponding to the print job or the service packet is started. In that case, the code information is written in, for example, a region having a predetermined data amount (for example, 8 bits), the region starting from a position following a predetermined data amount (number of bits) after the forefront bit of the synchronization signal.

<Description of Processing on Code Information in Communication Unit>

The image forming apparatus 3 of the present exemplary embodiment previously acquires, from the terminal device 2 (the code information storing portion 214), information on a position of the region where the code information is written, and information on correspondence relations between the code information and processing contents associated with packets. These sets of information, which are acquired from the terminal device 2 (the code information storing portion 214), are stored in the code information storing portion 315. Thereby, in a period when the sleep mode is set, the packet determining portion 314 identifies and extracts the code information from a packet received from the terminal device 2 on the basis of the information stored in the code information storing portion 315. Additionally, the image forming apparatus 3 specifies whether the received signal is the print job, and specifies a kind of service whose provision is requested by the service packet.

FIG. 6 described next is a diagram showing one example of a correspondence relation table showing a correspondence relation between the code information and "processing contents associated with packets," the correspondence relation table being stored in the code information storing portion 315 of the image forming apparatus 3 and the code information storing portion 214 of the terminal device 2.

The image forming apparatus 3 and the terminal device 2 have the same correspondence relation table, such as one illustrated in FIG. 6, showing a correspondence relation between "processing contents associated with packets" and code information, in the code information storing portion 315 and in the code information storing unit 214, respectively. In the correspondence relation table illustrated in FIG. 6, for example, code information "00000000" is associated with, as a processing content associated with a packet, a print job in which neither the external sheet supplying unit 34 nor the post-processing unit 37 is used. Code information "00000001" is associated with a print job in which the external sheet supplying unit 34 is used but the post-processing unit 37 is not used. Code information "00000010" is associated with a print job in which both of the external sheet supplying unit 34 and the post-processing unit 37 are used.

Additionally, code information "00000101" is associated with, as a processing content associated with a packet, for example, provision of information managed in the MIB configured inside the external storage unit 39. Code information "00000110" is associated with transmission of files stored in a confidential box configured inside the external storage unit 39. Code information "00000111" is associated with transmission of image data read by the image reading unit 35. Code information "00001000" is associated with transmission of image data from the FAX unit 36.

<Description of Power Supply to Each Functional Unit Upon Recovery from Sleep Node>

During a period when the image forming apparatus 3 is set to the sleep mode, the following operation is performed. When the packet determining portion 314 of the image forming apparatus 3 extracts the code information from a packet (a print job or a service packet) transmitted from the terminal device 2, the packet determining portion 314 specifies a processing content associated with the packet by referring to the correspondence relation table showing a correspondence relation between the code information and processing contents associated with packets, which is stored in the code information storing portion 315. Then, the packet determining portion 314 notifies the communication controller 311 of the specified processing content. The communication controller 311 notifies the activation controller 316 of the processing content specified by the packet determining portion 314. The activation controller 316 generates an activation instruction signal corresponding to the processing content specified by the packet determining portion 314, and transmits the activation instruction signal from the PCI_I/F portion 313 to the power supplying unit 38 via the PCI bus 40. Thereby, the power supplying unit 38 starts supplying power to functional units corresponding to the processing content associated with the packet, and the image forming apparatus 3 recovers from the sleep mode.

FIG. 7 described next is a diagram explaining contents indicated by activation instruction signals generated by the activation controller 316 in accordance with processing contents specified by the packet determining portion 314.

As shown in FIG. 7, in response to the processing content specified by the code information "00000000," the activation controller 316 generates an activation instruction signal that turns the controller 30 ON (supply power), the UI unit 32 ON, the image outputting unit 33 ON, the external sheet supplying unit 34 OFF (stop supplying power), the image reading unit 35 OFF, the FAX unit 36 OFF, the post-processing unit 37 OFF and the external storage unit 39 ON. That is, as has been mentioned above, the code information "00000000" is associated with the processing content of executing a print job in which neither the external sheet supplying unit 34 nor the post-processing unit 37 is used. For this reason, in order to set the operating mode for executing the processing as described above, the activation controller 316 generates the above-mentioned activation instruction signal, and transmits the activation instruction signal to the power supplying unit 38.

Additionally, in the processing content specified by the code information "00000001", the external sheet supplying unit 34 is used in a print job, and therefore, the activation controller 316 generates an activation instruction signal that additionally turns the external sheet supplying unit 34 ON. Furthermore, in the processing content specified by the code information "00000010", both of the external sheet supplying unit 34 and the post-processing unit 37 are used in a print job, and therefore, the activation controller 316 generates an activation instruction signal that turns the external sheet supplying unit 34 ON and the post-processing unit 37 ON.

Additionally, in response to the processing content "provision of information managed in the MIB inside the external storage unit 39" specified by the code information "00000101," the activation controller 316 generates an activation instruction signal that turns the controller 30 ON, the UI unit 32 OFF, the image outputting unit 33 OFF, the external sheet supplying unit 34 OFF, the image reading unit 35 OFF, the FAX unit 36 OFF, the post-processing unit 37 OFF and the external storage unit 39 ON. Moreover, in response to the processing content "transmission of files stored in a confidential box configured inside the external storage unit 39" specified by the code information "00000110," the activation controller 316 generates an activation instruction signal that turns the controller 30 ON, the UI unit 32 OFF, the image outputting unit 33 OFF, the external sheet supplying unit 34 OFF, the image reading unit 35 OFF, the FAX unit 36 OFF, the post-processing unit 37 OFF and the external storage unit 39 ON. Additionally, in response to the processing content "transmission of image data read by the image reading unit 35" specified by the code information "00000111," the activation controller 316 generates an activation instruction signal that turns the controller 30 ON, the UI unit 32 OFF, the image outputting unit 33 OFF, the external sheet supplying unit 34 OFF, the image reading unit 35 ON, the FAX unit 36 OFF, the post-processing unit 37 OFF and the external storage unit 39 ON. Furthermore, in response to the processing content "transmission of image data from the FAX unit 36" specified by the code information "00001000," the activation controller 316 generates an activation instruction signal that turns the controller 30 ON, the UI unit 32 OFF, the image outputting unit 33 OFF, the external sheet supplying unit 34 OFF, the image reading unit 35 OFF, the FAX unit 36 ON, the post-processing unit 37 OFF and the external storage unit 39 ON.

Thereby, the power supplying unit 38, having received any one of the activation instruction signals generated by the activation controller 316, controls power supply to each functional units (the controller 30, the UI unit 32, the image outputting unit 33, the external sheet supplying unit 34, the image reading unit 35, the FAX unit 36, the post-processing unit 37 and the external storage unit 39) in accordance with an instruction of the activation instruction signal. Thereby, the image forming apparatus 3 is caused to recover from the power saving state to the operating mode corresponding to the code information that is written in the packet.

Thus, the communication unit 31 and the power supplying unit 38 have a function as a setting unit that sets the image forming apparatus 3 from the power saving state to the operating mode (operational state) corresponding to the code information written in the packet.

<Description of Reception Processing on Packets>

Processing on packets received by the communication unit 31 in the image forming apparatus 3 of the present exemplary embodiment will be described.

FIG. 8 described next is a flowchart showing one example of a processing content performed by the image forming apparatus 3 of the exemplary embodiment upon receiving a packet.

As shown in FIG. 8, in the image forming apparatus 3 of the present exemplary embodiment, the communication controller 311 in the communication unit 31 monitors acquirement, by the NET_I/F portion 312, of a packet transmitted via the network 4. (step 101). When the NET_I/F portion 312 acquires a packet from the network 4 (Yes in step 101), the communication controller 311 transfers the acquired packet to the packet determining portion 314 (step 102). Thereby, the packet determining portion 314 performs filtering on the basis of the identification information such as a destination MAC address and a destination IP address of the acquired packet, and determines whether the acquired packet is addressed to the image forming apparatus 3 itself (step 103).

Meanwhile, when the NET_I/F portion 312 acquires no packet, the communication controller 311 continues monitoring packets received from the network 4 (NO in step 101).

As a result of the determination made by the packet determining portion 314, if the received packet is specified as a packet addressed to the image forming apparatus 3 itself (Yes in step 103), and if the image forming apparatus 3 is set to the sleep mode (Yes in step 104), the packet determining portion 314 extracts the code information from the packet on the basis of information on a position (refer to FIG. 5) in which the code information is written, the information being stored in the code information storing portion 315 (step 105). Then, the packet determining portion 314 specifies a processing content associated with the packet from the extracted code information by referring to the correspondence relation table on "processing contents associated with packets" and the code information (refer to FIG. 6) (step 106), the table stored in the code information storing portion 315. The packet determining portion 314 notifies the communication controller 311 of the specified processing content (step 107).

Meanwhile, as a result of the determination made by the packet determining portion 314, if the received packet is identified as one not being addressed to the image forming apparatus 3 itself (No in step 103), the communication controller 311 does not receive the packet (step 112), and continues monitoring packets received from the network 4.

The communication controller 311 notifies the activation controller 316 of the processing content specified by the packet determining portion 314 (step 108). The activation controller 316 generates an activation instruction signal corresponding to the notified processing content, and then transmits the activation instruction signal to the power supplying unit 38 (step 109). Upon receiving the activation instruction signal from the activation controller 316, the power supplying unit 38 controls power supply (refer to FIG. 7) to each of the functional units (the controller 30, the UI unit 32, the image outputting unit 33, the external sheet supplying unit 34, the image reading unit 35, the FAX unit 36, the post-processing unit 37 and the external storage unit 39) in accordance with an instruction of the activation instruction signal (step 110). Thereby, the image forming apparatus 3 is caused to recover from the power saving state to the operating mode corresponding to the code information written in the packet.

Furthermore, the communication controller 311 transfers the acquired packet to the controller 30 in a manner corresponding to the recovery of the controller 30 (step 111). Thereby, the controller 30 starts processing on the packet. That is, the controller 30 starts processing on data stored in the data field (the data region) of the packet. For example, if the packet is a print job, the controller 30 applies image processing on image data contained in the print job, and transfers the image data to which the image processing has been already applied to the image outputting unit 33. Then, an image forming operation is executed by the image outputting unit 33. Meanwhile, if the packet is a packet requesting to provide information managed in the MIB, the controller 30 provides this service.

Additionally, when the image formation apparatus 3 is set to any one of the operating modes (No in step 104), the communication controller 311 immediately transfers the acquired packet to the controller 30 (step 111). When the image formation apparatus 3 is set to any one of the operating modes, the controller 30 is in an operating state, and therefore, immediate transfer of the acquired packet to the controller 30 causes processing on the packet to be started.

After transferring the acquired packet to the controller 30 in step 111, the communication controller 311 returns to step 101, and monitors acquirement, by the NET_I/F portion 312, of a packet transmitted via the network 4.

As has been described above, upon receiving a print job or a service packet from the terminal device 2 during a period when the power saving state is set, the image forming apparatus 3 of the present exemplary embodiment operates as follows. Before the controller 30 performs processing of analyzing data stored in a data region in the packet, the image forming apparatus 3 determines whether the received signal is the print job, and determines a kind of service whose provision is requested by the service packet to specify the signal, on the basis of code information appended to the print job and the service packet. Then, in accordance with the specified print job or kind of service, the functional units of the image forming apparatus 3 that are caused to recover from the power saving state is determined, and power supply to the determined functional units is immediately started.

Thereby, waiting time from when a print job or a service packet is received to when processing corresponding to the received print job or service packet is started are shortened. Additionally, since power is supplied only to functional units that function in response to the received print job or service packet, power consumption is reduced as well.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   an information processor comprising a functional unit,
      wherein the information processor operates in an active state, and a power saving state consuming less power than the active state, and recovers to the active state by receiving a signal in the power saving state and processes information contained in the received signal; and
   a signal transmitting device that transmits a signal including identification information to the information processor,
   wherein the identification information identifies a processing content,
   wherein the information processor, in response to receiving, when the information processor is in the power saving state, the transmitted signal from the signal transmitting device, and before analyzing information stored in a data region of the transmitted signal determines, even in a state where the functional unit is not operative, the processing content of the transmitted signal using the identification information included in the transmitted signal, then recovers to the active state in which power is supplied to the functional unit to execute the determined processing content; and then starts processing the information stored in the data region of the transmitted signal,
   wherein each of the information processor and the signal transmitting device stores information about a region inside the transmitted signal in which the identification information is included,
   wherein the region is determined in advance, and
   wherein each of the information processor and the signal transmitting device stores information about a correspondence relation between the processing content associated with the transmitted signal and the identification information.

2. The information processing system according to claim 1, wherein each of the information processor and the signal transmitting device sets the region inside the transmitted signal in which the identification information is included, in a region used for establishing synchronization of communication between the signal transmitting device and the information processor via a communication line.

3. The information processing system according to claim 1, wherein each of the information processor and the signal transmitting device sets the region inside the transmitted signal in which the identification information is included, in a region starting from a position following a predetermined data amount after a region representing a start of a data region of the transmitted signal.

4. The information processing system according to claim 1, wherein the information processor determines a plurality of processing contents associated with the transmitted signal using code information included in the transmitted signal.

5. The information processing system according to claim 1, further comprising:
   a communication controller;
   an activation controller; and
   a power supplying unit;
   wherein the information processor determines whether or not the transmitted signal is addressed to the information processor,
   wherein, in response to determining that the transmitted signal is addressed to the information processor, the information processor then determines whether or not the information processor is currently operating in the power saving state,
   wherein, in response to determining that the information processor is currently operating in the power saving state, then the information processor extracts code information included in the transmitted signal, specifies a processing content associated with the transmitted signal using the extracted code information, and notifies the communication controller of the specified processing content,
   wherein, in response to being notified of the specified processing content, the communication controller notifies the activation controller of the specified processing content,
   wherein, in response to being notified of the specified processing content, the activation controller generates an activation instruction signal corresponding to the specified processing content and transmits the activation instruction signal to the power supplying unit, and
   wherein the power supplying unit controls power supply to the functional unit in accordance with the activation instruction signal.

6. An information processor comprising:
   a receiving unit that receives, from an external device, a signal including identification information identifying a processing content;
   functional units that each operate in an active state, and a power saving state consuming less power than the active state;
   a determining unit that, in response to the receiving unit receiving the signal, and before analyzing information stored in a data region of the received signal, determines, even in a state where the functional units are not operative, the processing content of the signal from the identification information included in the signal;
   a power supply unit that supplies power to at least one of the functional units to recover the at least one of the functional units from the power saving state to the active state and to execute the processing content determined by the determining unit; and
   a memory that stores information about a region inside the signal in which the identification information is included,
   wherein the region is determined in advance in the information processor and the external device, and wherein the memory stores information about a correspondence relation between the processing content associated with the signal and the identification information.

7. The information processor according to claim 6, wherein the determining unit determines the processing content of the signal using the identification information included in the region inside the signal, and
wherein the region is used for establishing synchronization of communication between the external device and the information processor.

8. The information processor according to claim 6, wherein the determining unit determines a plurality of processing contents associated with the signal using code information included in the signal.

9. The information processor according to claim 6, wherein the information processor determines whether or not the signal is addressed to the information processor,
wherein, in response to determining that the signal is addressed to the information processor, the information processor then determines whether or not the functional units are currently operating in the power saving state,
wherein, in response to determining that the functional units are currently operating in the power saving state, then the information processor extracts code information included in the signal, specifies a processing content associated with the signal using the extracted code information, and notifies a communication controller of the specified processing content,
wherein, in response to being notified of the specified processing content, the communication controller notifies an activation controller of the specified processing content,
wherein, in response to being notified of the specified processing content, the activation controller generates an activation instruction signal corresponding to the specified processing content and transmits the activation instruction signal to the power supply unit, and
wherein the power supply unit controls power supply to the at least one of the functional units in accordance with the activation instruction signal.

10. An information processing system comprising:
a signal transmitting device that transmits a signal which includes identification information identifying a processing content associated with the signal; and
an information processing device that comprises a memory that stores a correspondence relation between the identification information and a functional unit of the information processing device that is necessary to execute the processing content,
wherein the information processing device operates in an active state and a power saving state consuming less power than the active state,
wherein, in response to the information processing device receiving, in the power saving state, the signal from the signal transmitting device, the information processing device determines, even in a state where the functional unit is not operative, the processing content of the signal using the identification information included in the signal and then recovers to the active state in which power is supplied to the functional unit to execute the determined processing content according to the correspondence relation stored in the memory,
wherein each of the information processing device and the signal transmitting device stores information about are ion inside the signal in which the identification information is included,
wherein the region is determined in advance, and
wherein each of the information processing device and the signal transmitting device stores information about a correspondence elation between the processing content associated with the signal and the identification information.

11. The information processing system according to claim 10, wherein the information processing device comprises:
a processor that processes data included in the signal transmitted from the signal transmitting device by controlling the functional unit of the information processing device; and
a determining unit that determines the processing content associated with the signal, and
wherein, if the information processing device receives, in the power saving state, the signal from the signal transmitting device, then the determining unit determines the processing content of the signal using the identification information included in the signal without supplying power to the processor.

12. The information processing system according to claim 10, wherein the information processing device determines a plurality of processing contents associated with the signal using code information included in the signal.

13. The information processing system according to claim 10, further comprising:
a communication controller;
an activation controller; and
a power supplying unit;
wherein the information processing device determines whether or not the signal is addressed to the information processing device,
wherein, in response to determining that the signal is addressed to the information processing device, the information processing device then determines whether or not the information processing device is currently operating in the power saving state,
wherein, in response to determining that the information processing device is currently operating in the power saving state, then the information processing device extracts code information included in the signal, specifies a processing content associated with the signal using the extracted code information, and notifies the communication controller of the specified processing content,
wherein, in response to being notified of the specified processing content, the communication controller notifies the activation controller of the specified processing content,
wherein, in response to being notified of the specified processing content, the activation controller generates an activation instruction signal corresponding to the specified processing content and transmits the activation instruction signal to the power supplying unit, and
wherein the power supplying unit controls power supply to the functional unit in accordance with the activation instruction signal.

14. An information processing device comprising:
a receiving unit that receives, from an external device, a signal which includes identification information identifying a processing content associated with the signal;
a plurality of functional units that operate in an active state to execute a processing content and a power saving state consuming less power than the active state;
a memory that stores a correspondence relation between the identification information and the functional units that is necessary to execute the processing content; and a determining unit that determines the processing content of the signal using the identification information included in the signal, wherein, in response to the receiving unit receiving, in the power saving state, the signal from the external device, the determining unit determines, even in a state where the functional units are not operative, the processing content of the signal using the identification information included in the signal and then the functional units recover to the active state to execute the determined processing content according to the correspondence relation stored in the memory, wherein each of the memory and the external device stores information about a region inside the signal in which the identification information is included, wherein the region is determined in advance, and wherein each of the memory and the external device stores information about a correspondence relation between the processing content associated with the signal and the identification information.

15. The information processing device according to claim 14, further comprising;

a processor that processes data included in the signal transmitted from the external device by controlling the functional units, wherein, if the receiving unit receives, in the power saving state, the signal from the external device, then the determining unit determines the processing content of the signal using the identification information included in the signal without supplying power to the processor.

16. The information processing device according to claim 14, wherein the determining unit determines a plurality of processing contents associated with the signal using code information included in the signal.

17. The information processing device according to claim 14, wherein the information processing device determines whether or not the signal is addressed to the information processing device, wherein, in response to determining that the signal is addressed to the information processing device, the information processing device then determines whether or not the functional units are currently operating in the power saving state, wherein, in response to determining that the functional units are currently operating in the power saving state, then the information processing device extracts code information included in the signal, specifies a processing content associated with the signal using the extracted code information, and notifies a communication controller of the specified processing content, wherein, in response to being notified of the specified processing content, the communication controller notifies an activation controller of the specified processing content, wherein, in response to being notified of the specified processing content, the activation controller generates an activation instruction signal corresponding to the specified processing content and transmits the activation instruction signal to a power supply unit, and wherein the power supply unit controls power supply to the functional units in accordance with the activation instruction signal.

* * * * *